United States Patent
Kwon et al.

(10) Patent No.: US 9,927,850 B2
(45) Date of Patent: Mar. 27, 2018

(54) SYSTEMS AND METHODS FOR REDUCING VIBRATION ASSOCIATED WITH A COMPONENT IN AN INFORMATION HANDLING SYSTEM

(71) Applicant: Dell Products L.P., Round Rock, TX (US)

(72) Inventors: Haesung Kwon, Austin, TX (US); Bernard D. Strmiska, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/076,307

(22) Filed: Mar. 21, 2016

(65) Prior Publication Data

US 2017/0269644 A1    Sep. 21, 2017

(51) Int. Cl.
G06F 1/16 (2006.01)
G06F 1/18 (2006.01)
G11B 33/12 (2006.01)

(52) U.S. Cl.
CPC .............. G06F 1/187 (2013.01); G06F 1/181 (2013.01); *G11B 33/124* (2013.01); *G11B 33/128* (2013.01)

(58) Field of Classification Search
CPC ....... G06F 1/187; G06F 1/181; G11B 33/124; G11B 33/128

USPC ....................... 361/679.37, 679.39, 724, 727
See application file for complete search history.

(56) References Cited

U.S. PATENT DOCUMENTS

| 5,332,306 A * | 7/1994 | Babb ................... H05K 7/1405 312/223.1 |
| 7,551,433 B2 * | 6/2009 | Hammer ................. G06F 1/187 361/679.36 |
| 2004/0095716 A1 * | 5/2004 | McAlister ............... G06F 1/187 361/679.33 |
| 2006/0023413 A1 * | 2/2006 | Lo .......................... G06F 1/184 361/679.02 |

* cited by examiner

*Primary Examiner* — James Wu
(74) *Attorney, Agent, or Firm* — Jackson Walker L.L.P.

(57) ABSTRACT

A component carrier may include a carrier front wall and a plurality of carrier side walls extending in a substantially parallel orientation to each other from opposite edges of the chassis front wall, and defining a component channel between them. The carrier side walls may include respective guide flanges extending substantially perpendicularly therefrom such that the guide flanges are in a substantially parallel orientation to each other and the guide flanges are oriented relative to the remainder of the component carrier such that when a component is mounted within the component channel to the component carrier, and the guide flanges may define a plane whereby a combined mass on a first side of the plane of the component carrier and the component is approximately equal to a combined mass on a second side of the component carrier and the component.

16 Claims, 16 Drawing Sheets

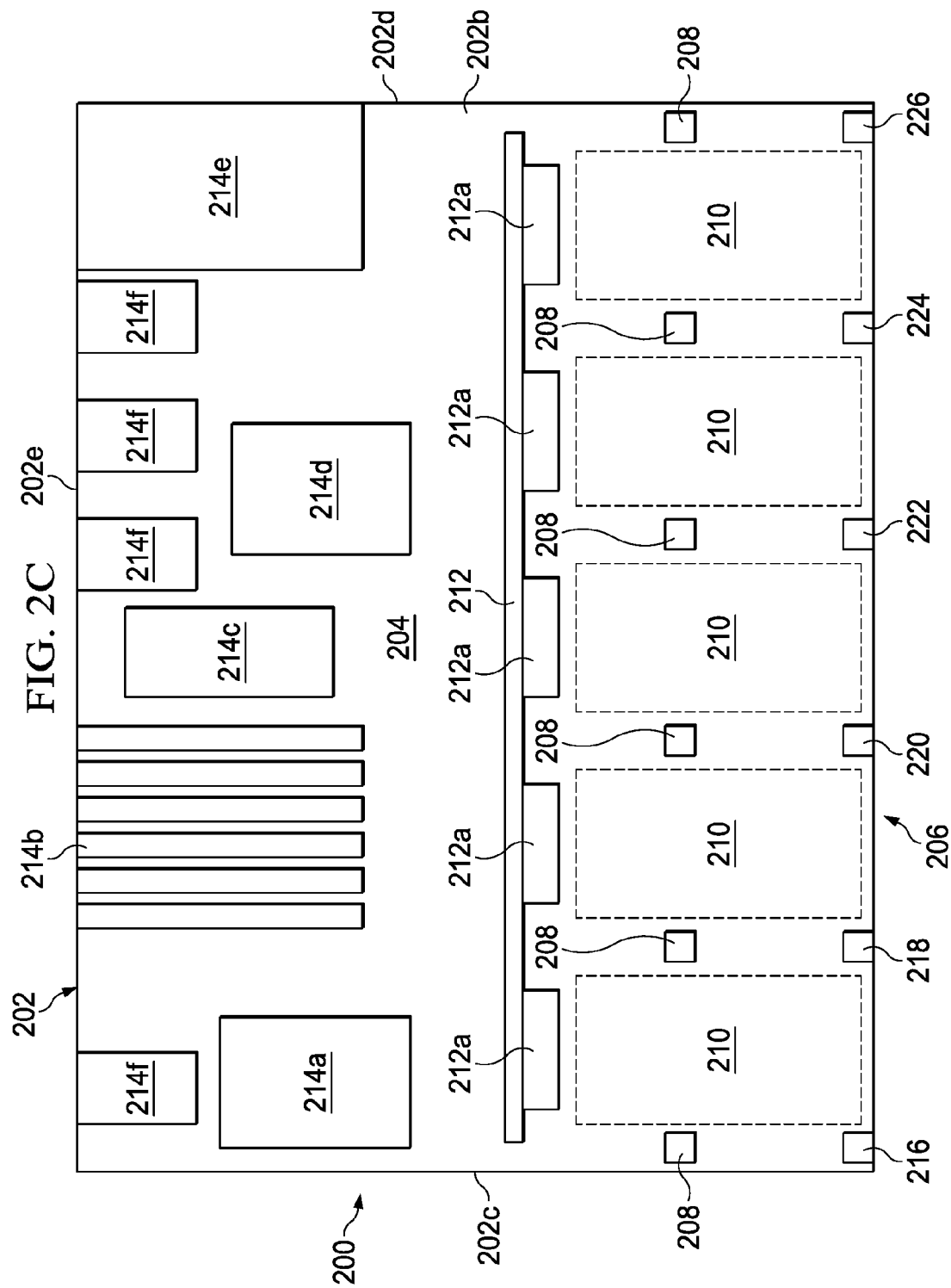

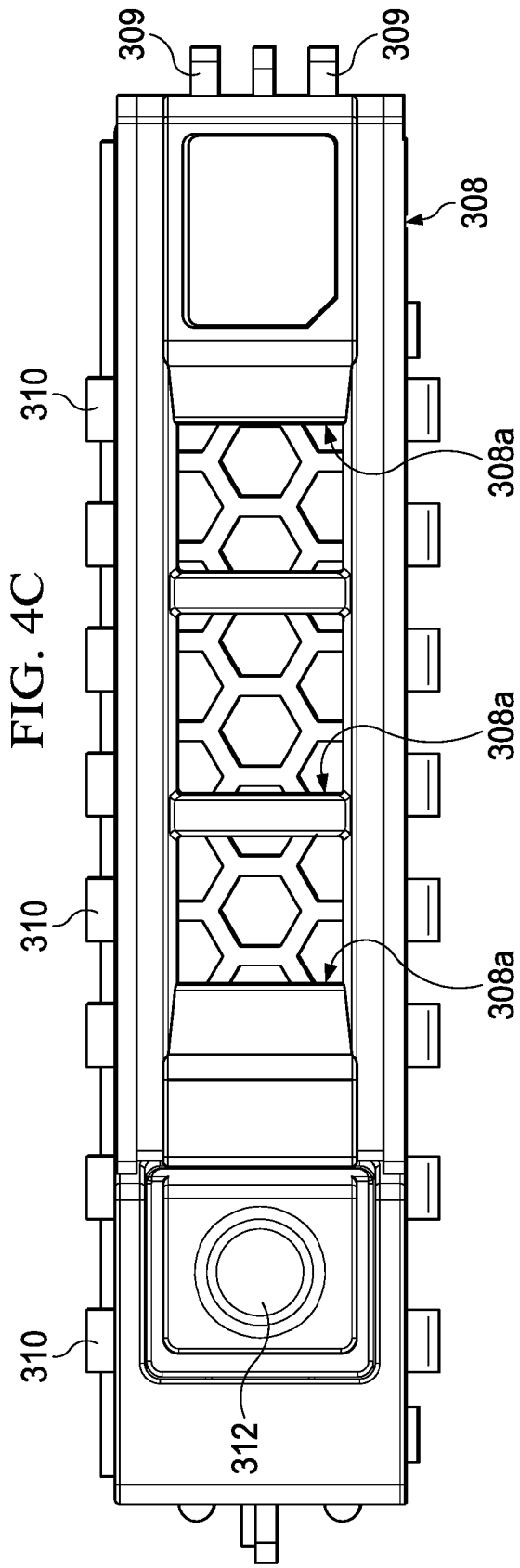

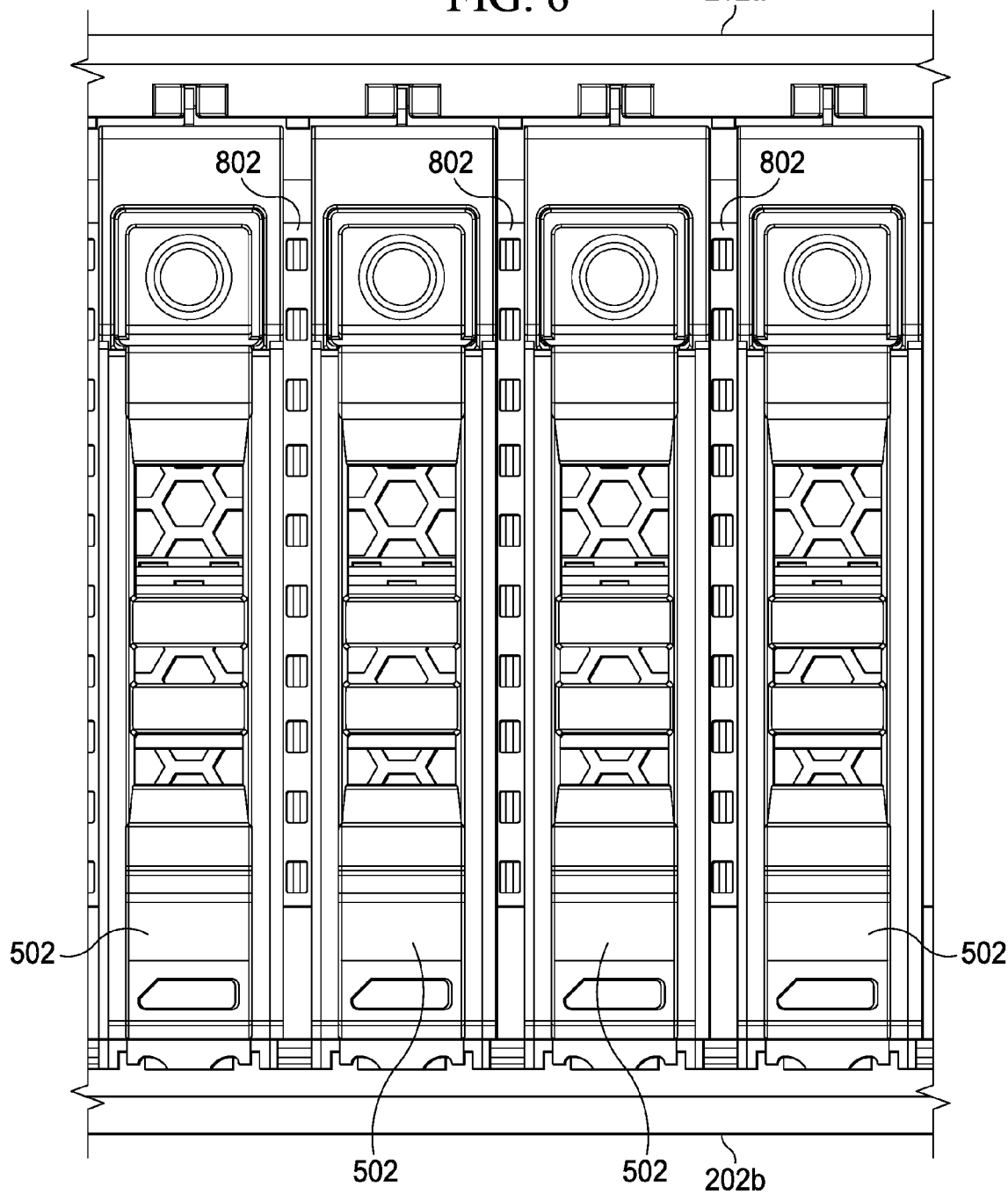

SYSTEMS AND METHODS FOR REDUCING VIBRATION ASSOCIATED WITH A COMPONENT IN AN INFORMATION HANDLING SYSTEM

TECHNICAL FIELD

The present disclosure relates generally to information handling systems, and more particularly to a component carrier and guiding system to minimize rotational vibration of a component in a chassis of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, servers and storage systems, sometimes include a chassis that houses the components of the system. For example, some servers include a chassis that defines a component enclosure for coupling a plurality of storage drives (e.g., hot-plug hard drives) adjacent a front entrance of the chassis, and that houses the other server components of the server opposite the storage drives from the front entrance of the chassis. Oftentimes, certain components, in particular storage drives, having motors or other mechanical devices that cause vibration between such components and portions of the chassis. Because such vibration can cause undesirable side effects, such as inoperability, vibrational interference with other server components, and undesired acoustic noise, it may be desirable to provide a component carrier and guiding system to minimize or eliminate such vibration.

SUMMARY

In accordance with the teachings of the present disclosure, the disadvantages and problems associated with component vibration in an information handling system may be reduced or eliminated.

In accordance with embodiments of the present disclosure, a component carrier may include a carrier front wall and a plurality of carrier side walls extending in a substantially parallel orientation to each other from opposite edges of the chassis front wall, and defining a component channel between them. The carrier side walls may include respective guide flanges extending substantially perpendicularly therefrom such that the guide flanges are in a substantially parallel orientation to each other and the guide flanges are oriented relative to the remainder of the component carrier such that when a component is mounted within the component channel to the component carrier, and the guide flanges may define a plane whereby a combined mass on a first side of the plane of the component carrier and the component is approximately equal to a combined mass on a second side of the component carrier and the component.

In accordance with and other embodiments of the present disclosure, an information handling system may include a chassis having a plurality of component slots and at least one component carrier received in a respective one of the plurality of component slots. The component carrier may include a carrier front wall and a plurality of carrier side walls extending in a substantially parallel orientation to each other from opposite edges of the chassis front wall, and defining a component channel between them. The carrier side walls may include respective guide flanges extending substantially perpendicularly therefrom such that the guide flanges are in a substantially parallel orientation to each other and the guide flanges are oriented relative to the remainder of the component carrier such that when a component is mounted within the component channel to the component carrier, and the guide flanges may define a plane whereby a combined mass on a first side of the plane of the component carrier and the component is approximately equal to a combined mass on a second side of the component carrier and the component.

In accordance with and other embodiments of the present disclosure, a component carrier may include a carrier front wall and a plurality of carrier side walls extending in a substantially parallel orientation to each other from opposite edges of the chassis front wall, and defining a component channel between them, wherein the carrier side walls each include a plurality of respective non-contiguous guide flanges extending substantially perpendicularly therefrom such that the guide flanges are in a substantially parallel orientation to each other.

In accordance with and other embodiments of the present disclosure, an information handling system may include a chassis having a plurality of component slots and at least one component carrier received in a respective one of the plurality of component slots. The component carrier may include a carrier front wall and a plurality of carrier side walls extending in a substantially parallel orientation to each other from opposite edges of the chassis front wall, and defining a component channel between them, wherein the carrier side walls each include a plurality of respective non-contiguous guide flanges extending substantially perpendicularly therefrom such that the guide flanges are in a substantially parallel orientation to each other.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2C illustrates a block diagram of a front view of selected components of the component chassis depicted in FIGS. 2A and 2B, in accordance with embodiments of the present disclosure;

FIG. 4C illustrates a front view of the example component mounted to the component carrier depicted in FIG. 4A, in accordance with embodiments of the present disclosure;

FIG. 6 illustrates a front view of a plurality of the example component carriers depicted in FIGS. 4A-4C coupled to the example component chassis depicted in FIGS. 2A and 2B using the backplane depicted in FIG. 2D, in accordance with embodiments of the present disclosure;

DETAILED DESCRIPTION

Preferred embodiments and their advantages are best understood by reference to FIGS. 1 through 8B, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

Figure 1:
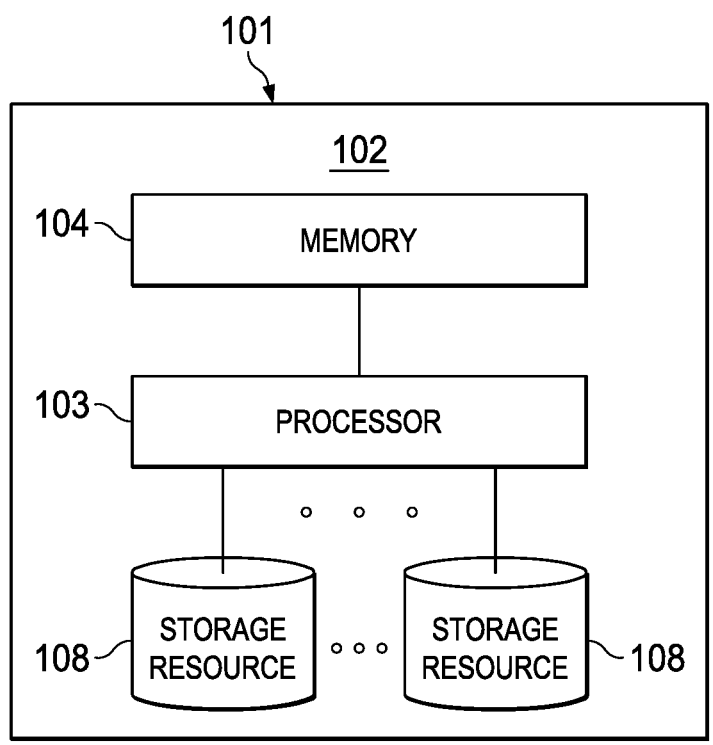
FIG. 1 illustrates a block diagram of selected components of an example information handling system, in accordance with embodiments of the present disclosure.

FIG. 1 illustrates a functional block diagram of selected components of an example information handling system 102, in accordance with embodiments of the present disclosure. In some embodiments, information handling system 102 may be a personal computer (e.g., a desktop computer or a portable computer). In other embodiments, information handling system 102 may comprise a storage server for archiving data.

As depicted in FIG. 1, information handling system 102 may include a chassis 101 housing a processor 103, a memory 104 communicatively coupled to processor 103, and a plurality of storage resources 108 communicatively coupled to processor 103.

Chassis 101 may be an enclosure that serves as a container for various information handling systems and information handling resources, and may be constructed from steel, aluminum, plastic, and/or any other suitable material. Although the term "chassis" is used, chassis 101 may also be referred to as a case, cabinet, tower, box, enclosure, and/or housing. In certain embodiments, chassis 101 may be configured to hold and/or provide power to a plurality of information handling systems and/or information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 108, and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 102 is turned off.

A storage resource 108 may include a system, device, or apparatus configured to store data. Storage resource 108 may include one or more hard disk drives, magnetic tape libraries, optical disk drives, magneto-optical disk drives, solid state storage drives, compact disk drives, compact disk arrays, disk array controllers, and/or any other systems, apparatuses or devices configured to store data.

In addition to processor 103, memory 104, and storage resources 108, information handling system 102 may include one or more other information handling resources. Such an information handling resource may include any component system, device or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

Figure 2A:
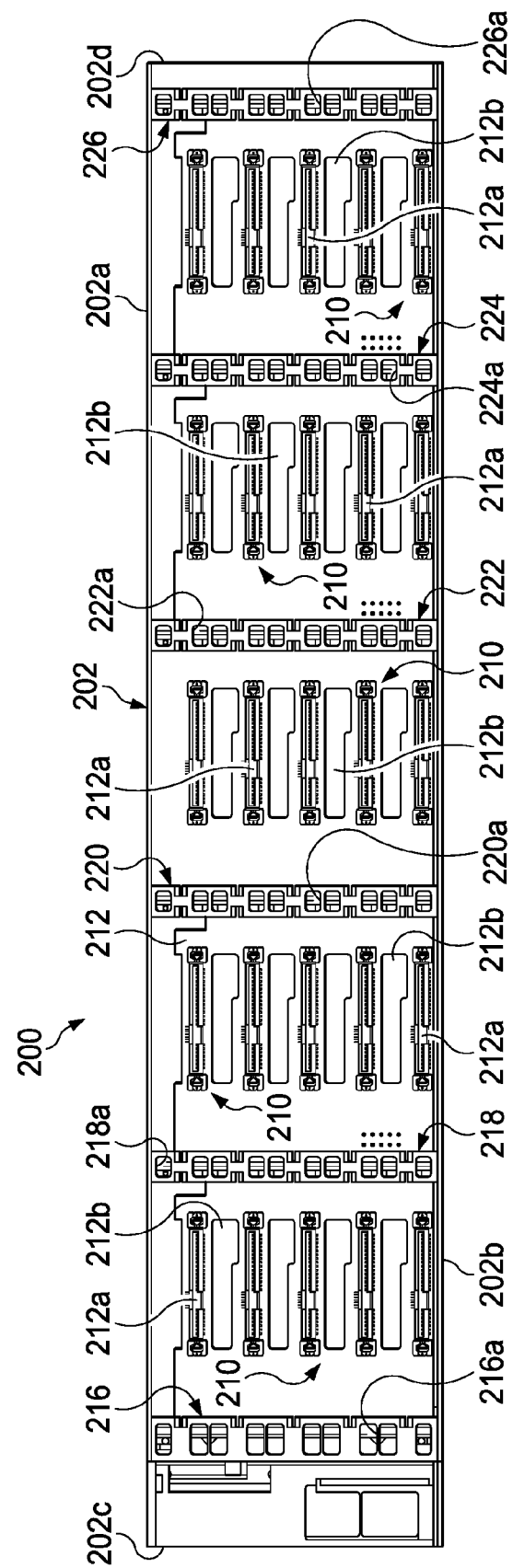
FIG. 2A illustrates a front view of selected components of an example component chassis, in accordance with embodiments of the present disclosure.
Figure 2B:
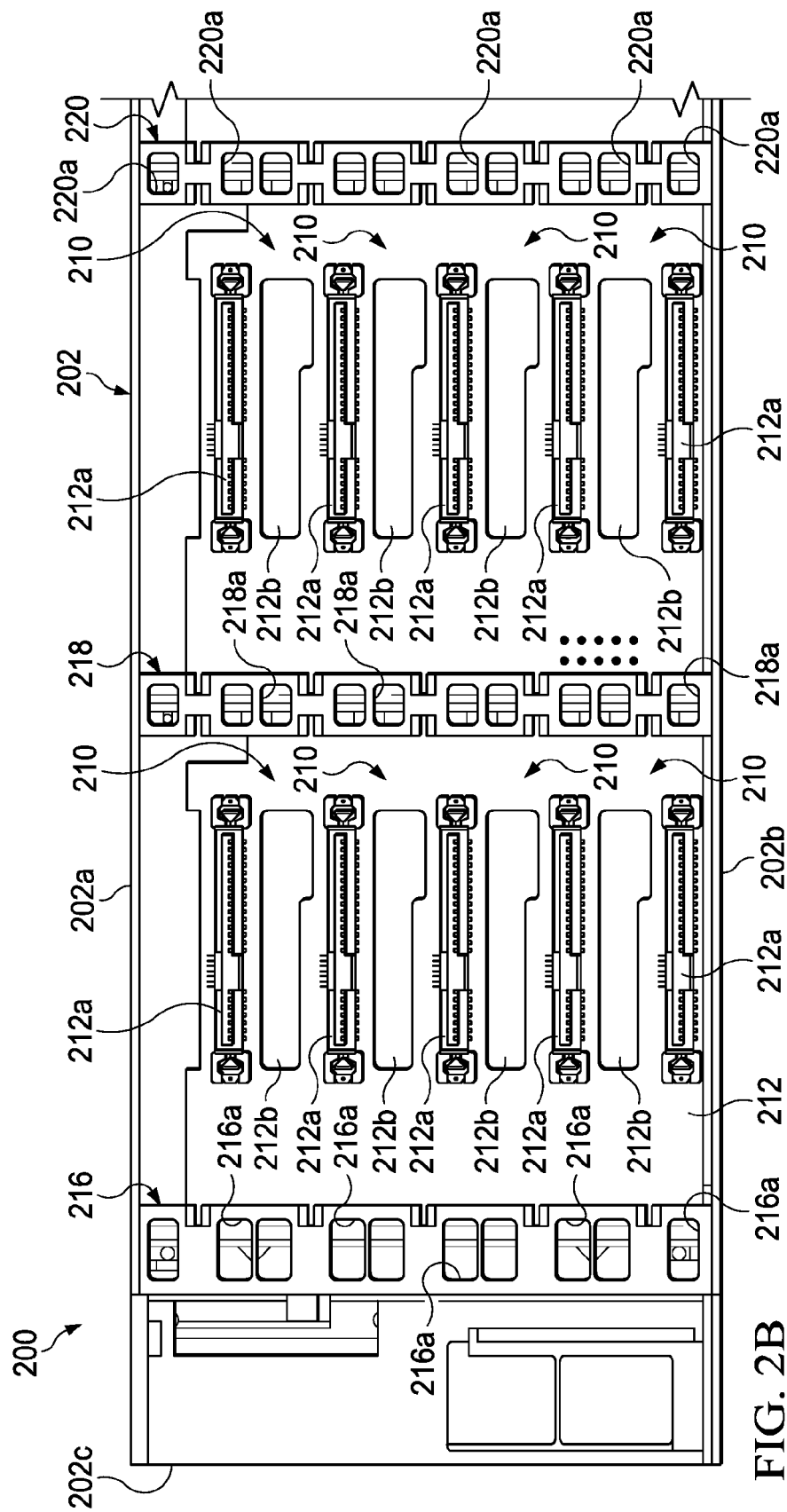
FIG. 2B illustrates a blown-up front view of selected components of the component chassis depicted in FIG. 2A, in accordance with embodiments of the present disclosure.

FIGS. 2A-2C illustrate various views of selected components of an example component chassis 200, in accordance with embodiments of the present disclosure. In some embodiments, chassis 101 of FIG. 1 may be implemented using component chassis 200. Component chassis 200 may comprise a server chassis that houses the components of a server including a plurality of storage resources for such server at a front entrance of component chassis 200. However, other component chassis configurations may benefit from the teachings of the present disclosure and thus are envisioned as falling within its scope. Component chassis 200 may include a base 202 having a top wall 202a, a bottom wall 202b located opposite component chassis 200 from top wall 202a, a plurality of side walls 202c and 202d which may be located opposite component chassis 200 from each other and extending between top wall 202a and bottom wall 202b, and a rear wall 202e extending between top wall 202a, bottom wall 202b, and side walls 202c and 202d. A chassis enclosure 204 may be defined between top wall 202a, bottom wall 202b, and side walls 202c and 202d, and may includes a chassis entrance 206 that is defined by edges of top wall 202a, bottom wall 202b, and side walls 202c and 202d that are opposite rear wall 202e. A plurality of guide members 208 may be positioned in chassis enclosure 204 to define a plurality of component slots 210 (illustrated with dashed lines in FIG. 2C). In the embodiments represented by FIGS. 2A-2C, component chassis 200 may provide five columns that each include five component slots, but other numbers and configurations of component slots are envisioned as falling within the scope of the present disclosure. Furthermore, guide members 208 may include a variety of coupling and guiding features for coupling and guiding component carriers and components into component slots 210, and may be replaced or supplemented with a variety of coupling and guiding features known in the art while remaining within the scope of the present disclosure.

A backplane 212 may be located in chassis enclosure 204 adjacent the plurality of component slots 210 and opposite the plurality of component slots 210 from chassis entrance 206. A respective component connector 212a may extend from backplane 212 adjacent each of the plurality of component slots 210. A plurality of backplane airflow apertures 212b may be defined in backplane 212 and, in the illustrated embodiment, located adjacent component connectors 212a, but other configurations of backplane airflow apertures 212b are envisioned as falling within the scope of the present disclosure. A plurality of components 214a, 214b, 214c, 214d, 214e, and 214f may be located in chassis enclosure 204 opposite backplane 212 from the plurality of component slots 210, and may include a processing system 214a, a memory system 214b, a controller 214c, a card 214d, a power system 214e, a fan system 214f, and/or any of a variety of other computing components known in the art. Furthermore, any or all of components 214a-f may be coupled to backplane 212 and/or each other via circuit boards, wired subsystems, wireless subsystems, and/or other coupling subsystems known in the art.

Chassis venting members 216, 218, 220, 222, 224, and 226 may be located adjacent each of the plurality of component slots 210. In the illustrated embodiment, chassis venting members 216 and 226 may be located adjacent groups (e.g., respective columns of five component slots 210) of the plurality of component slots 210 (e.g., on opposite sides of the plurality of component slots 210), and chassis venting members 218, 220, 222, and 224 may be located between groups (e.g., pairs of columns of five component slots 210) of the plurality of component slots 210. While each of chassis venting members 216-226 are illustrated as being located immediately adjacent chassis entrance 206, in other embodiments chassis venting members 216-226 may be positioned at different locations between chassis entrance 206 and backplane 212 while remaining within the scope of the present disclosure. Any or all of chassis venting elements 216-226 may include coupling and guiding features for assisting guide members 208 in coupling and guiding component carriers and components into component slots 210. Each of chassis venting elements 216-226 may define one or more respective chassis venting member airflow apertures 216a, 218a, 220a, 222a, 224a, and 226a.

In some embodiments, chassis venting member airflow apertures 216a-226a on chassis venting members 216-226 may be statically "tuned" or otherwise configured for a particular system based on the cooling needs of that system. For example, a system may include a variety of cooling criteria for both components positioned in component slots 210 as well as components 214a-214e located opposite backplane 212 from component slots 210, and chassis venting member airflow apertures 216a-226a on chassis venting members 216-226 may be statically sized, dimensioned, directed, and/or otherwise configured in order to direct air to components to provide a required level of cooling to those components while not providing more airflow than is needed to cool those components. As such, chassis venting member airflow apertures 216a-226a on chassis venting members 216-226 may be configured to direct a portion of the airflow that enters chassis entrance 206 to the components located in component slots 210 to provide sufficient cooling for those components, and also direct the remaining portion of the airflow towards backplane airflow apertures 212b defined by backplane 212. In a specific example, chassis venting member airflow apertures 216a-226a on chassis venting members 216-226 may be configured to direct airflow that enters chassis entrance 206 to particular backplane airflow apertures 212b defined by backplane 212 that provide airflow to components (e.g., processing system 214a) that are known to generate more heat than other components (e.g., card 214d) that are located opposite backplane 212 from the plurality of component slots 210. While a specific example has been described, one of skill in the art in possession of the present disclosure may recognize that a variety of tuning or other configurations of chassis venting members 216-226 according to the teachings of the present disclosure will fall within its scope.

In some embodiments, chassis venting members 216-226 may include elements (e.g., shutters, airflow directionality elements, etc.) that provide for dynamic adjustment of chassis venting member airflow apertures 216a-226a to change the size, dimensions, directionality, and/or configuration of chassis venting member airflow apertures 216a-226a to allow for the dynamic adjustment of airflow received through chassis enclosure 204 from chassis entrance 206. For example, controller 214c may be coupled to each of chassis venting members 216-226 as well as any of the components in component slots 210 (e.g., via the backplane 212 and component connectors 212a) and/or components 214a-214f in order to determine cooling needs and dynamically adjust the configuration of chassis venting member airflow apertures 216a-226a to direct airflow received through chassis enclosure 204 to different components as the cooling needs of the system change. While a specific embodiment of the dynamic adjustment of airflow via chassis venting members 216-226 has been described, one of skill in the art in possession of the present disclosure may recognize that other dynamic adjustment devices and methods may be provided in chassis 200 while remaining within the scope of the present disclosure.

Figure 2D:
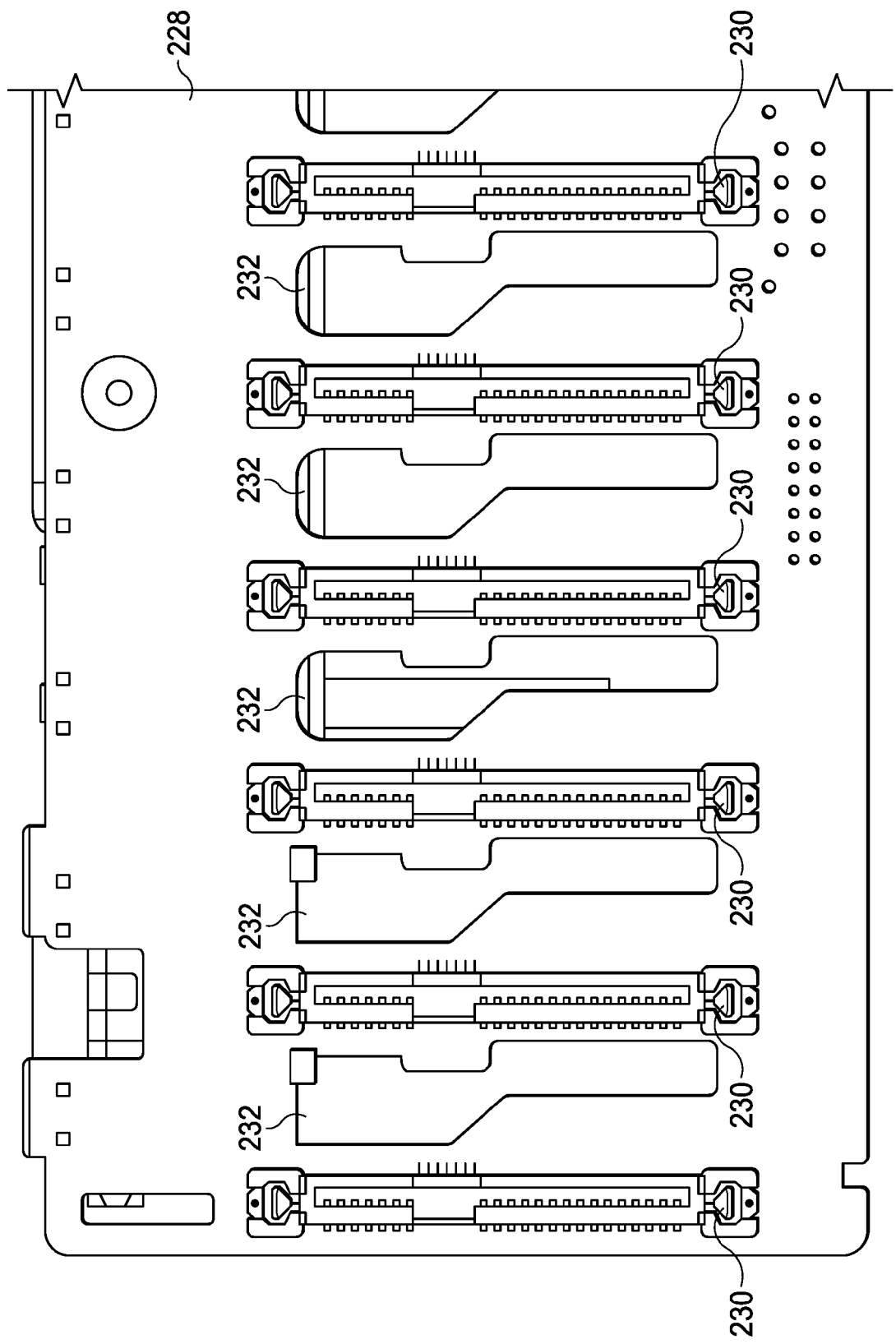
FIG. 2D illustrates a front view of selected components of an example backplane that may be used in the component chassis depicted in FIGS. 2A and 2B, in accordance with embodiments of the present disclosure.

FIG. 2D illustrates a front view of selected components of another example backplane 228 that may be used in the component chassis depicted in FIGS. 2A and 2B (e.g., used in lieu of backplane 212), in accordance with embodiments of the present disclosure. Backplane 228 may provide a plurality of component connectors 230 and backplane airflow apertures 232 that may be similar to component connectors 212a and backplane airflow apertures 212b discussed above, but provided in a different orientation. One of skill in the art may recognize that component connectors 212a provide for the "horizontal" orientation of the component slots 210 in FIGS. 2A-2C (e.g., the five columns of horizontally oriented component slots 210 illustrated and discussed above), while backplane 228 and component connectors 230 may be provided in the chassis 200 (with some modifications) to provide for a "vertical" orientation of component slots 210 (e.g., the single row of vertically oriented component slots along the length of component chassis 200 discussed in further detail below.) One of skill in the art in possession of the present disclosure may recognize that modifications to chassis 200 and chassis components may be provided when the backplane 228 is included in chassis 200 in order to provide the functionality discussed below while remaining within the scope of the present disclosure.

Figure 3A:
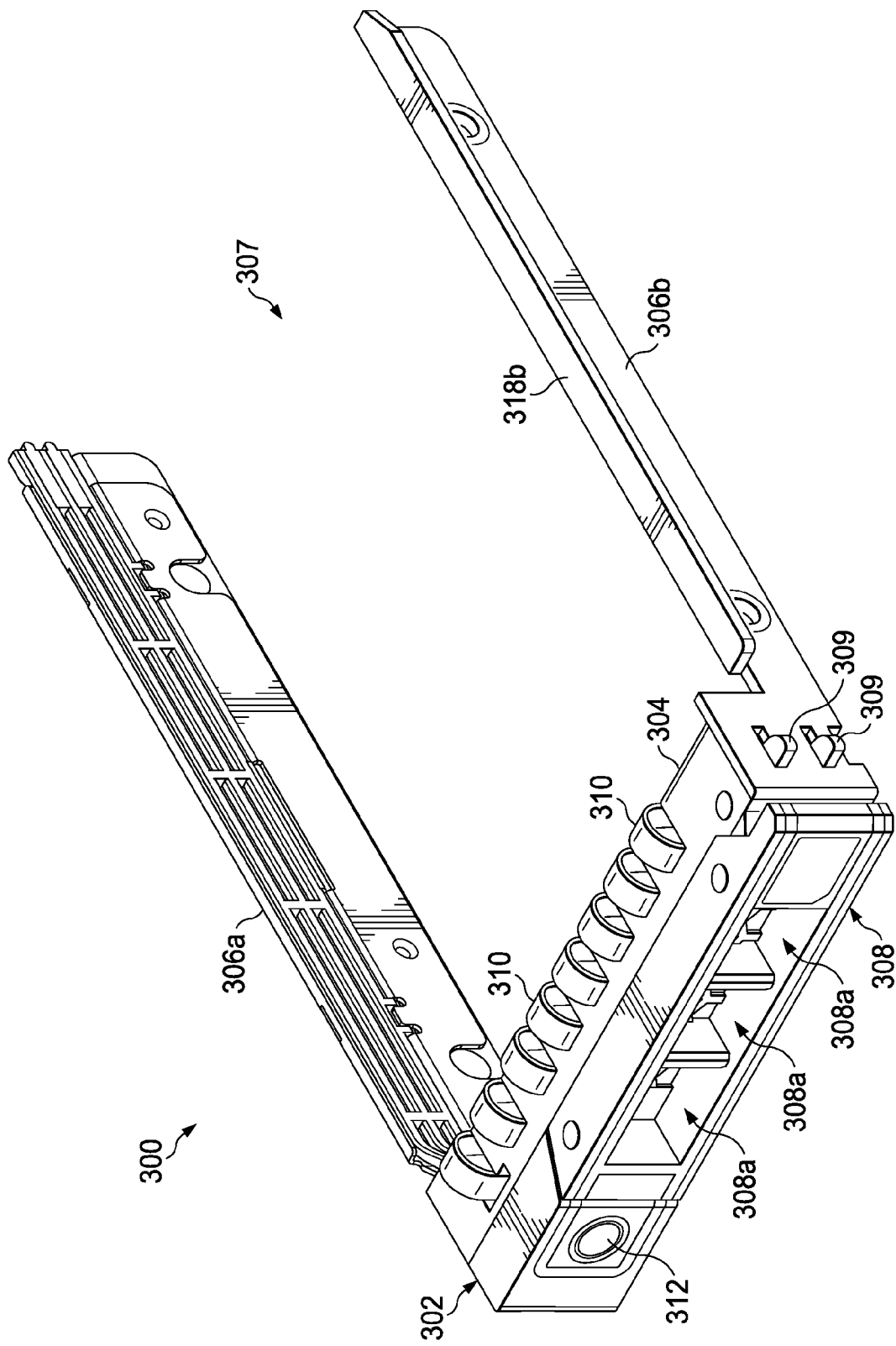
FIG. 3A illustrates a perspective view of an example component carrier, in accordance with embodiments of the present disclosure.
Figure 3B:
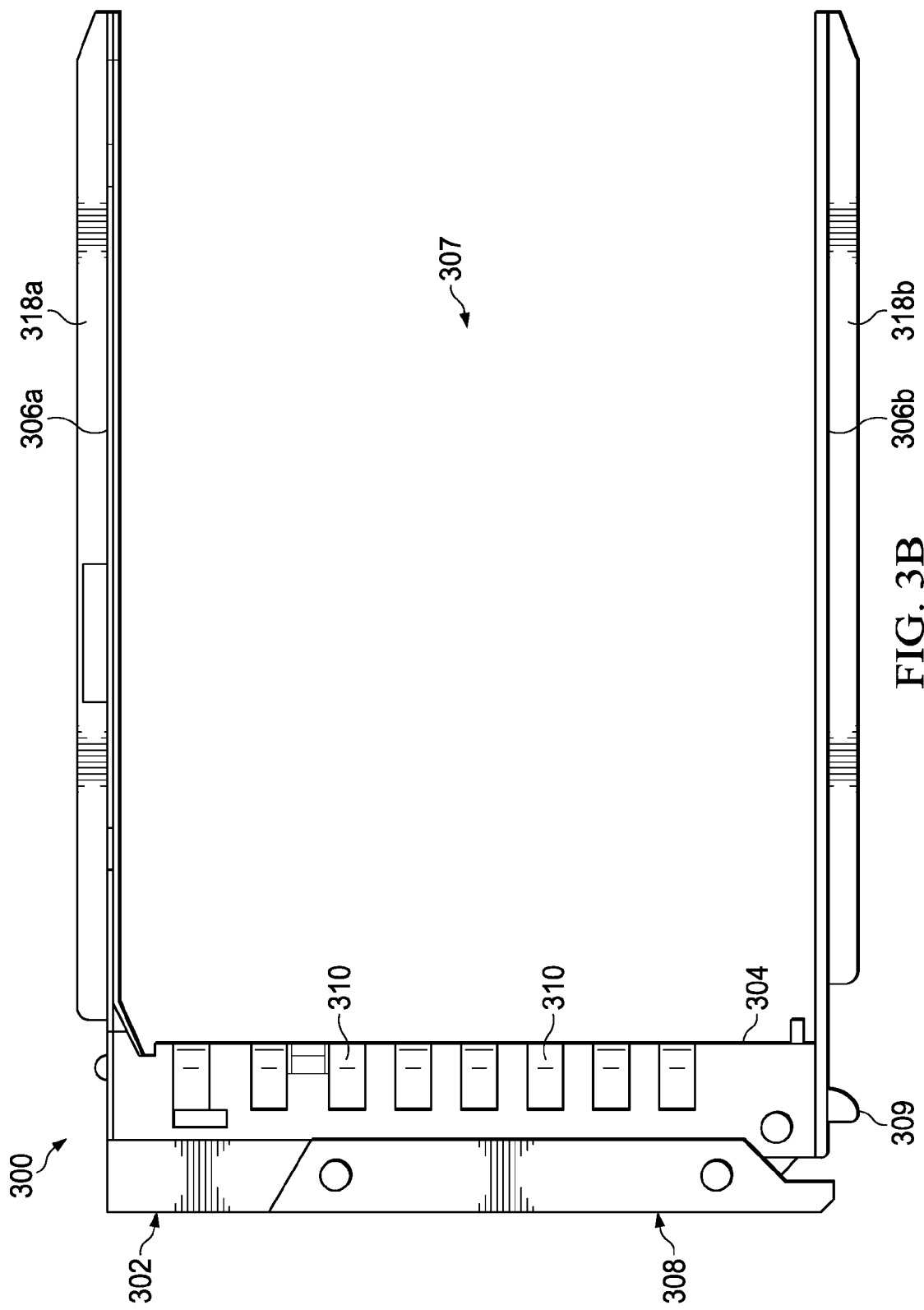
FIG. 3B illustrates a top view of the example component carrier depicted in FIG. 3A, in accordance with embodiments of the present disclosure.

FIGS. 3A and 3B illustrate views of an example component carrier 300, in accordance with embodiments of the present disclosure. In some embodiments, component carrier 300 may comprise a storage device carrier that is configured to mount to a storage drive such as, for example, a hard disk drive, a solid state drive, and/or other storage drives known in the art. However, a variety of other components may benefit from the teachings of the present disclosure and thus are envisioned as falling within its scope. Component carrier 300 may include a carrier base 302 having a carrier front wall 304 and a plurality of carrier side walls 306a and 306b that may extend in a substantially parallel orientation to each other from opposite edges of the chassis front wall 304 to define a component channel 307 between them. Each of chassis side walls 306a and 306b may include a variety of coupling and guide features that are configured to couple component carrier 300 to a component, and engage component chassis 200 to guide component carrier 300 into a component slot 210. For example, each of chassis side walls 306a and 306b may respectively include guide flanges 318a and 318b extending therefrom. Guide flanges 318a and 318b may extend in a substantially parallel orientation (including, in some embodiments, a co-planar orientation) to each other and extend from the remainder of their respective chassis side walls 306a and 306b. Thus, each guide flange 318a, 318b may extend substantially perpendicularly from the remainder of their respective chassis side walls 306a, 306b.

Chassis front wall 304 may include a carrier securing handle 308 that may define, along with chassis front wall 304, a plurality of component carrier airflow apertures 308a that extend through carrier securing handle 308 and carrier front wall 304 to the component channel 307. A plurality of component chassis engagement features 309 and 310 extend from carrier front wall 304 and are configured to engage component chassis 200 when component carrier 300 is positioned in a component slot 210 to couple component carrier 300 to component chassis 200. A latch 312 may be provided on carrier front wall 304 and configured to secure and release carrier securing handle 308 to allow component carrier 300 to be secured to component chassis 200.

Component carrier 300 may be configured with a minimalistic guiding scheme (e.g., via guide flanges 318a and 318b of carrier side walls 306a and 306b) that reduces the cross-section of component carrier 300 (i.e., when looking directly at carrier front wall 304 opposite component channel 307) relative to conventional component carriers while retaining a component, which may allow for more airflow past the sides of the component carrier 300 (e.g., immediately adjacent carrier side walls 306a and 306b) when the component carrier 300 is positioned in a component slot 210. Furthermore, component carrier airflow apertures 308a may be sized, dimensioned, and/or otherwise configured to provide just enough airflow into component channel 307 (and to a component) when component carrier 300 is positioned in a component slot 210 (e.g., based on known airflow amounts generated through component chassis 200 using fan systems 214f in component chassis 200) that may allow for the component to be sufficiently cooled for proper operation, which may allow any remaining available airflow to be directed past the sides of component carrier 300 (e.g., immediately adjacent carrier side walls 306a and 306b) and to the other components in component chassis 200. Finally, the mounting features that provide for the mounting of a component to component carrier 300 may be configured to minimize the air gap between carrier front wall 304 and a component mounted to component carrier 300 in component channel 307 in order to minimize the space taken up in the component chassis 200 by component carrier 300 while also minimizing airflow impedance between carrier front wall 304 and the component mounted to component carrier 300, discussed in further detail below. As such, component carrier 300 may be designed, dimensioned, and/or otherwise configured to provide the enhanced airflow discussed below based on specific needs of the system components and the system provided by component chassis 200.

Figure 4A:
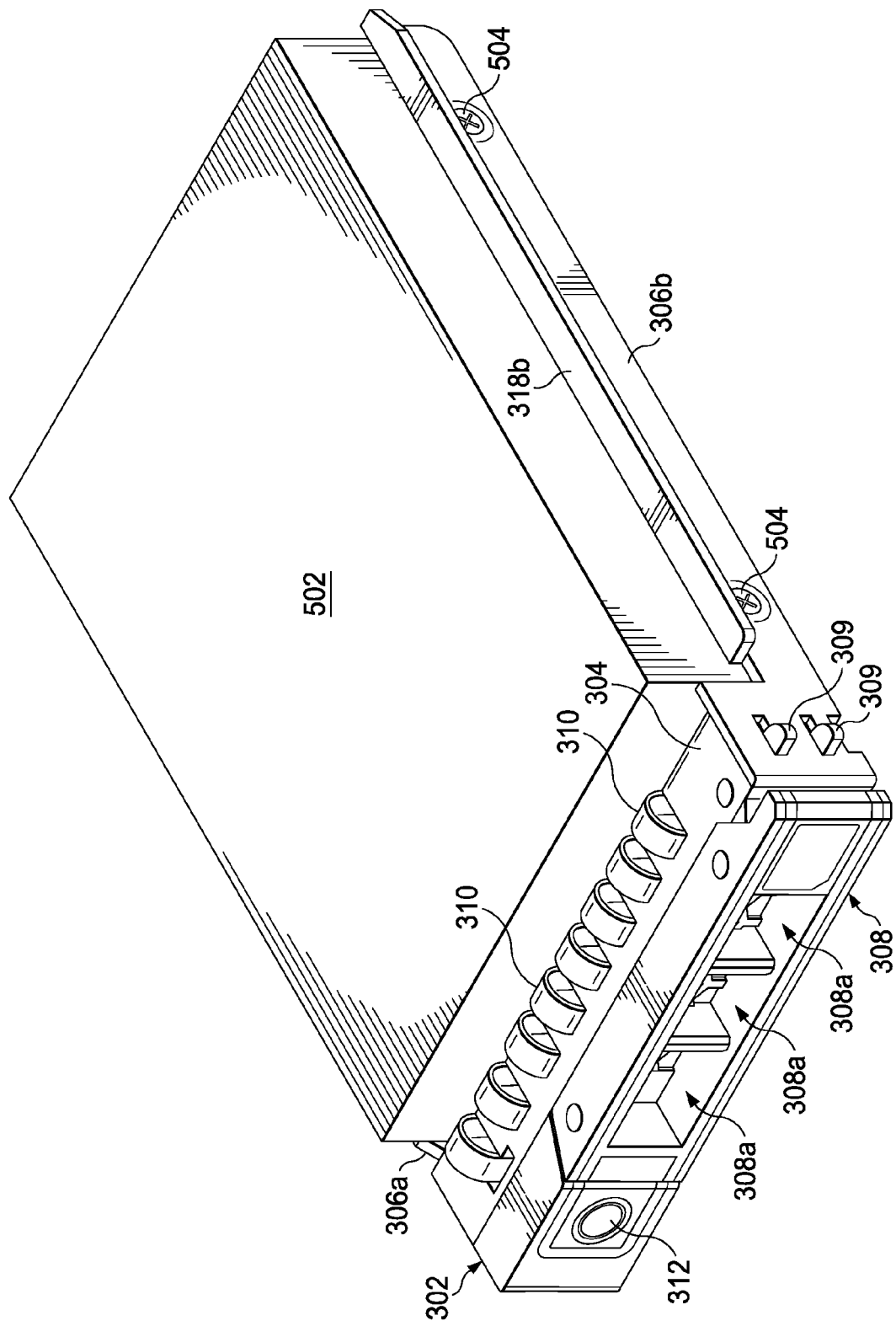
FIG. 4A illustrates a perspective view of an example component mounted to the component carrier depicted in FIGS. 3A and 3B, in accordance with embodiments of the present disclosure.
Figure 4B:
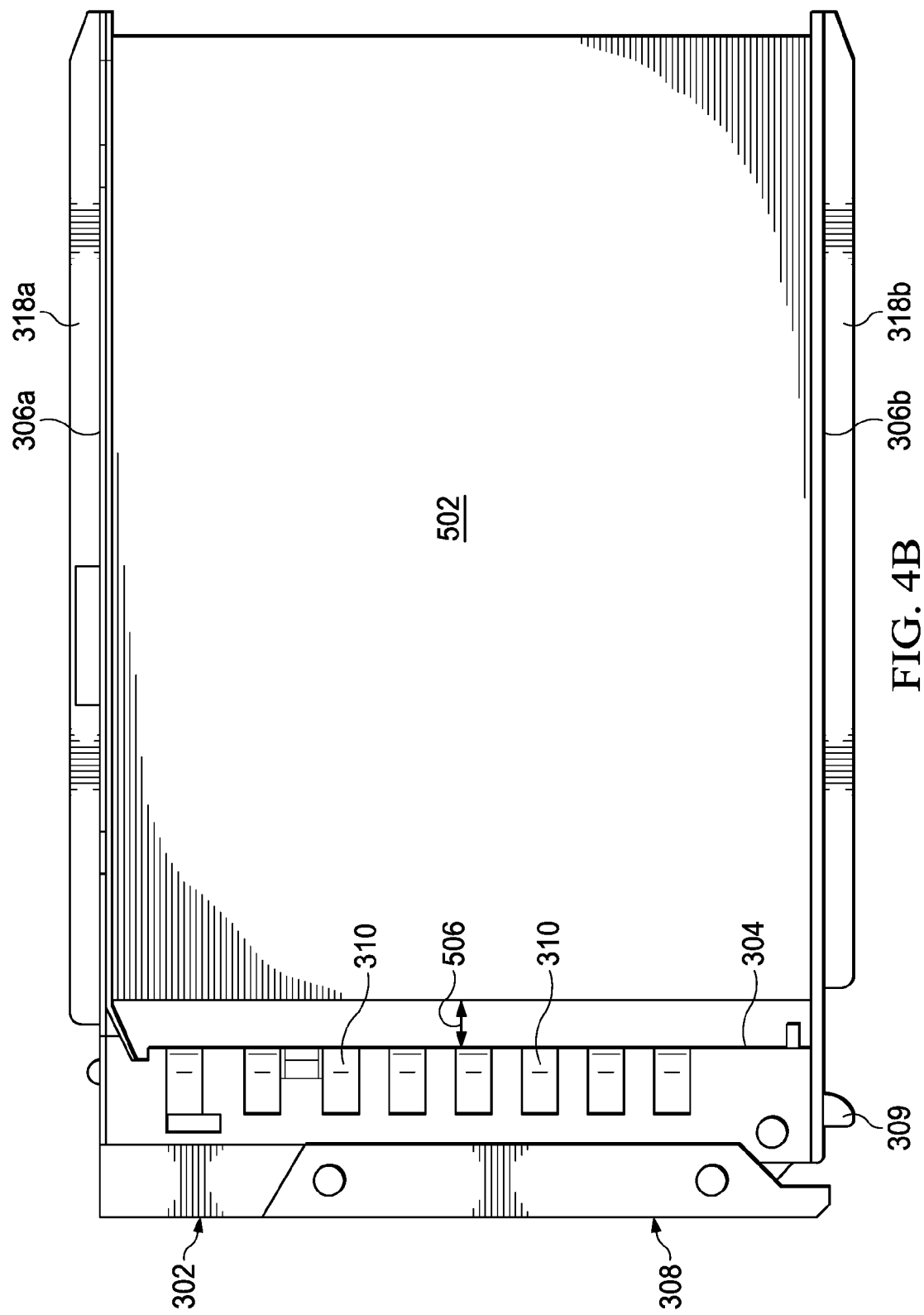
FIG. 4B illustrates a top view of the example component mounted to the component carrier depicted in FIG. 4A, in accordance with embodiments of the present disclosure.

FIGS. 4A-4C illustrate views of an example component 502 mounted to component carrier 300 depicted in FIGS. 3A and 3B, in accordance with embodiments of the present disclosure. As shown in FIGS. 5A-5C, a component 502 may be positioned in component channel 307 and component 502 may be mounted to component carrier 300 by, for example, providing couplers (e.g., the screws 504 in carrier side walls 306b illustrated in FIG. 4A) that engage component carrier 300 and component 502. With component 502 mounted to component carrier 300, a spacing 506 may be provided between component 502 and carrier front wall 304 that may be optimized to both minimize the volume taken up in component chassis 200 by the component/component carrier, while also minimizing impedance to airflow that enters component channel 307 through carrier front wall 304. In addition to optimized spacing 506, benefits of carrier 300 over a conventional component/component carrier may include a smaller cross section than that of conventional carriers, and larger component carrier airflow apertures 308a than those of conventional carriers that allow increased airflow to component 502 while also directing airflow not utilized to cool component 502 past the carrier side walls 306a and 306b. Furthermore, features on component carrier 300 may provide for interlocking between component carriers 300 and component chassis 200 to provide directed airflow channels that are combined with chassis venting members to direct airflow as discussed below.

In some embodiments, guide flanges 318a and 318b may be arranged relative to the remainder of component carrier 300 such that when component 502 is mounted to component carrier 300, guide flanges 318a and 318b define a plane whereby a combined mass of carrier 300 and component 502 on a first side of the plane is approximately equal to a combined mass of carrier 300 and component 502 on a second side of the plane, such that guide flanges 318a and 318b align with an approximate center of gravity of the combined carrier 300 and component 502. As so aligned, vibration (e.g., rotational vibration in embodiments in which component 502 is a hard disk drive) of components when engaged in chassis 200 may be minimized.

Figure 5:
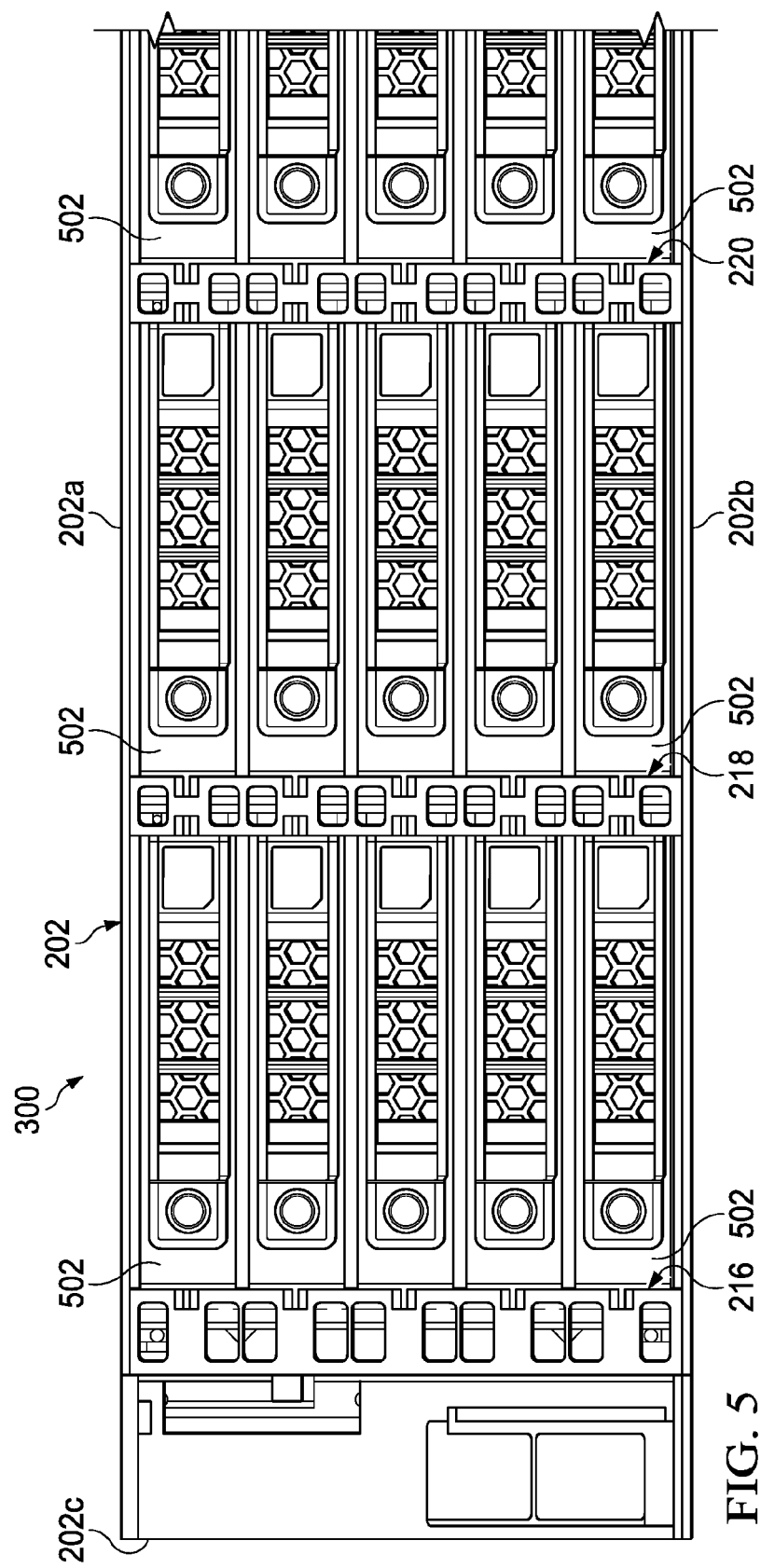
FIG. 5 illustrates a front view of a plurality of the example component carriers depicted in FIGS. 4A-4C coupled to the example component chassis depicted in FIGS. 2A and 2B; in accordance with embodiments of the present disclosure.

FIG. 5 illustrates a front view of a plurality of example component carriers 300 depicted in FIGS. 4A-4C coupled to example component chassis 300 depicted in FIGS. 2A and 2B; in accordance with embodiments of the present disclosure. As shown in FIG. 5, a carrier 300 with a component 502 coupled thereto may be positioned in each of one or more of component slots 210 defined by component chassis 200 by placing carrier 300 adjacent component slot 210 such that the rear of component 502 (i.e., a surface of component 502 that is opposite component 502 from carrier front wall 304) is adjacent the component slot 210, and then moving carrier 300 and component 502 into component slot 210 (e.g., via engagement of guide flanges 318a and 318b and/or other guide features on the carrier side walls 306a and 306b and guide members 208 on component chassis 200) until a connector on component 502 engages its respective connector 212a on backplane 212 that is adjacent that component slot 210. As shown in FIG. 5, with each of carriers 300 and components 502 positioned in component slots 210 in component chassis 200, the carriers 300 and components 502 may interlock with each other and chassis venting members 216-226 such that airflow channels between carriers 300 and components 502, as well as between chassis venting members 216-226 and carriers 300 and components 502, are minimized or blocked such that component carrier airflow apertures 308a defined by component carriers 300 and chassis venting member airflow apertures 216a-226a defined by chassis venting members 216-226 provide the primary means for airflow entering chassis entrance 206 to reach component enclosure 204.

Accordingly, airflow that enters component chassis 200 may be directed using chassis venting member airflow apertures 216a-226a. Such airflow may be generated by, for example, activating fan systems 214f to push air in component enclosure 204 out of back wall 202e of component chassis 200 and cause air to be drawn through chassis entrance 206 to produce an airflow that enters chassis enclosure 204 through chassis entrance 206. Positioning of the carriers 300 and components 502 in component chassis 200 may results in airflow entering chassis entrance 206 being directed either through component carrier airflow apertures 308a to cool components 502, or through chassis venting member airflow apertures 216a-226a to backplane 212, and through backplane airflow apertures 212b to cool one or more of components 214a-214e opposite backplane 212 from chassis entrance 206. In some embodiments, chassis venting member airflow apertures 216a-226a may be tuned, dimensioned, or otherwise configured to direct airflow towards particular ones of components 214a-214e. For example, processing system 214 may produce more heat than component 502 and/or other components 214b-214e, and chassis venting member airflow apertures 216a and 218a may be configured to direct airflow entering chassis entrance 206 adjacent chassis venting members 216 and 218 toward processing system 214a in order to cool processing system 214a. Similarly, others of chassis venting member 220-226 may be configured to direct airflow towards specific components that need cooling as well. As such, chassis venting members 216-226 may be statically configured for the specific components in the component chassis 200 to ensure cooling of those components using the airflow directed along carrier side walls 306a and 306b of the component carriers 300.

In some embodiments, controller 214c may be coupled to chassis venting members 216-226 in order to dynamically adjust dimensions or configuration of chassis venting member airflow apertures 216a-226a as the cooling needs of components 502 and/or components 214a-214e change. For example, processing system 214a may require a first cooling level during normal operations, and then may require a second cooling level that is higher than the first cooling level during the performance of some workloads (e.g., processing intensive workloads). In response to determining that processing system 214a requires a second cooling level (e.g., in response to detecting the running of a particular workload), controller 214c may send instructions to adjust the configuration of chassis venting member airflow apertures 216a and 218a to direct increased airflow entering chassis entrance 206 adjacent chassis venting members 216 and 218 toward processing system 214a in order to provide additional cooling of processing system 214a.

In some embodiments, in addition to controlling the configuration of chassis venting members 216-226, controller 214c may control configuration of component carrier airflow apertures 308a on component carriers 300, the operation of fan systems 214f, and/or other subsystems in component chassis 200 in order to optimize the airflow through component chassis 200 to ensure proper and sufficient cooling of the components in component chassis 200.

FIG. 6 illustrates a front view of a plurality of example component carriers 300 depicted in FIGS. 4A-4C coupled to example component chassis 200 depicted in FIGS. 2A and 2B using the backplane 228 depicted in FIG. 2D, in accordance with embodiments of the present disclosure. As discussed above, the vertical orientation of the carriers 300 and components 502 may be enabled by backplane 228 discussed above with reference to FIG. 2D. As can be seen in FIG. 6, with carriers 300 and components 502 positioned in component chassis 200, chassis venting members 802 similar to the chassis venting members 216-226 discussed above may be located between carriers 300 and components 502 and may direct airflow past carriers 300 and components 502 similarly as discussed above in a static or dynamic manner in order to cool components in component chassis 200 as needed.

Figure 7A:
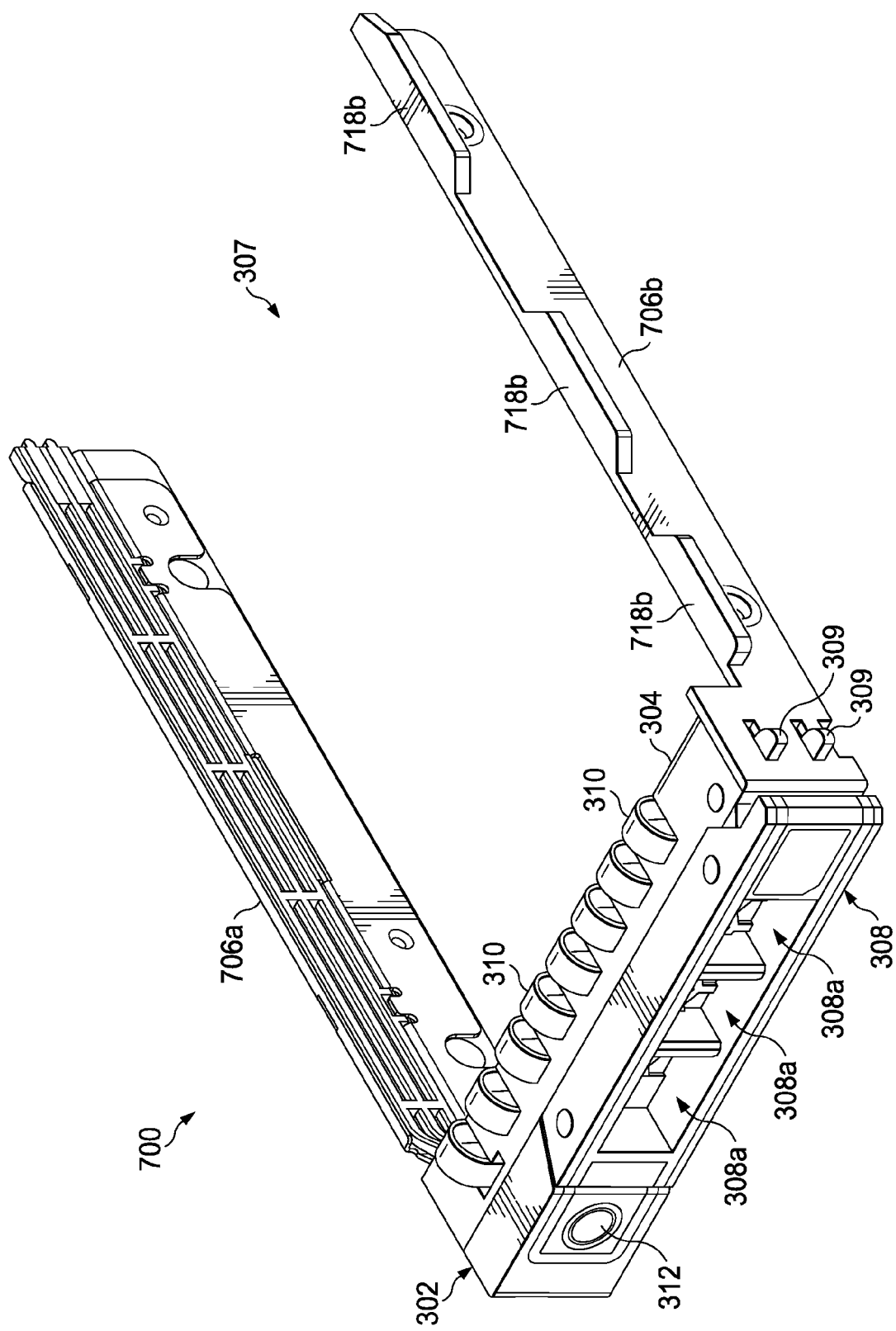
FIG. 7A illustrates a perspective view of another example component carrier, in accordance with embodiments of the present disclosure.
Figure 7B:
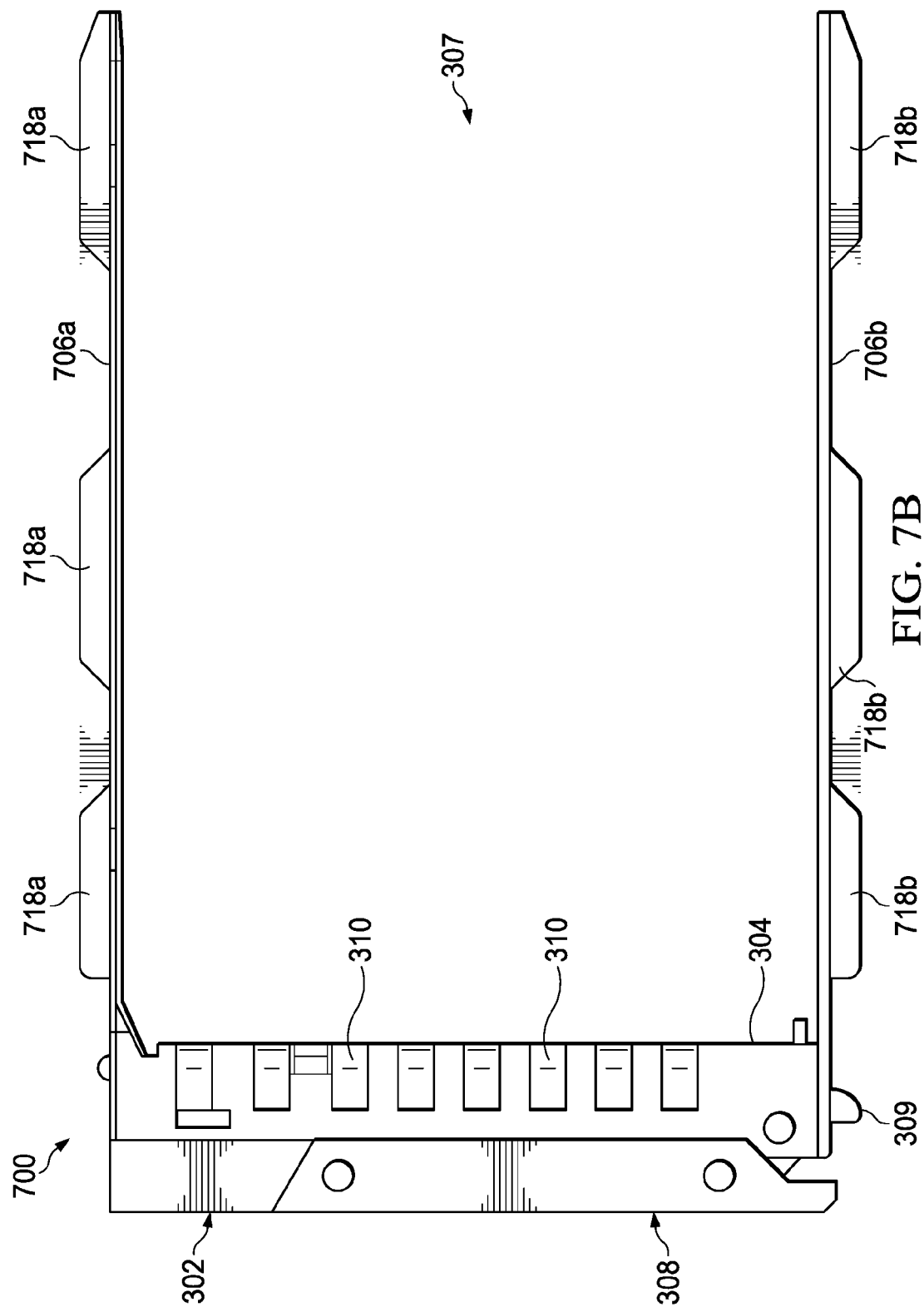
FIG. 7B illustrates a top view of the example component carrier depicted in FIG. 7A, in accordance with embodiments of the present disclosure.

FIGS. 7A and 7B illustrate views of another example component carrier 700 which may be used in lieu of component carrier 300, in accordance with embodiments of the present disclosure. Example component carrier 700 of FIGS. 7A and 7B may be similar to component carrier 300, and thus only their material differences are described below. A main difference between component carrier 700 and component carrier 300 is that component carrier 700 may include carrier side walls 706a and 706b in lieu of carrier side walls 306a and 306b. Carrier side walls 706a and 706b may extend in a substantially parallel orientation to each other from opposite edges of the chassis front wall 304 to define a component channel 307 between them. Each of chassis side walls 706a and 706b may include a variety of coupling and guide features that are configured to couple component carrier 700 to a component, and engage component chassis 200 to guide component carrier 700 into a component slot 210. For example, each of chassis side walls 706a and 706b may respectively include non-contiguous guide flanges 718a and 718b extending therefrom. Guide flanges 718a and 718b may extend in a substantially parallel orientation (including, in some embodiments, a co-planar orientation) to each other and extend from the remainder of their respective chassis side walls 706a and 706b. Thus, each guide flange 718a, 718b may extend substantially perpendicularly from the remainder of their respective chassis side walls 706a, 706b. Unlike carrier 300, which includes continuous guide flanges 318a and 318b, carrier 700 may include non-contiguous guide flanges 718a and 718b, wherein spaces are present between guide flanges 718a and spaces are present between guide flanges 718b.

Figure 8A:
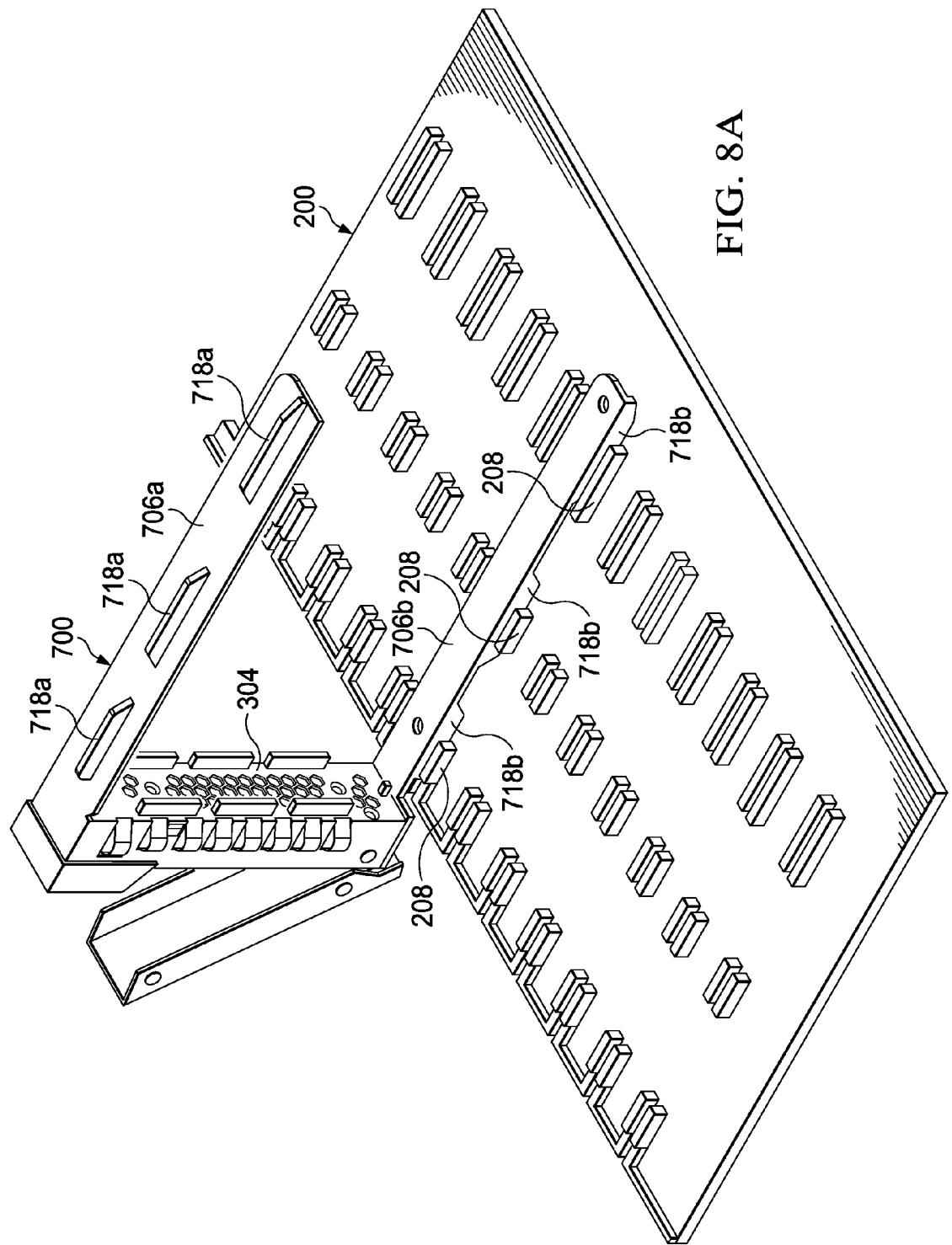
FIG. 8A illustrates selected portions of the example component carrier depicted in FIGS. 7A and 7B during insertion into chassis, in accordance with embodiments of the present disclosure.
Figure 8B:
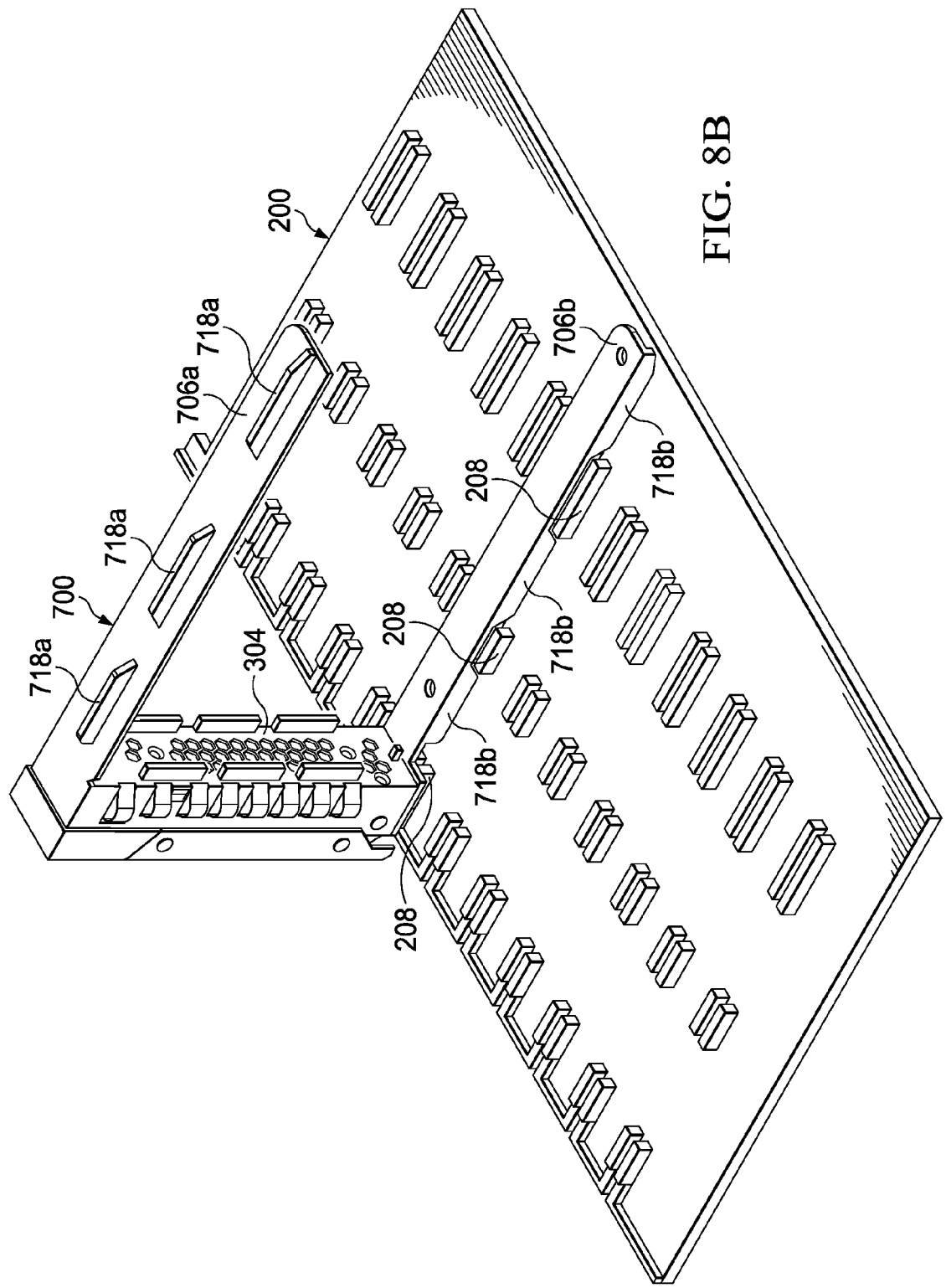
FIG. 8B illustrates selected portions of the example component carrier depicted in FIGS. 7A and 7B after engagement with the chassis, in accordance with embodiments of the present disclosure.

FIG. 8A illustrates selected portions of example component carrier 700 depicted in FIGS. 7A and 7B during insertion into chassis 200 and FIG. 8B illustrates selected portions of example component carrier 700 depicted in FIGS. 7A and 7B after engagement with chassis 200, in accordance with embodiments of the present disclosure. As shown in FIG. 8A, during insertion of component carrier 700 into chassis 200, guide flanges 718a and 718b may come in physical contact with guide members 208 of chassis 200, in order to guide carrier 700 and a component mounted thereto into a component slot 210 such that the component mates with a corresponding connector 212a. However, as shown in FIG. 8B, once carrier 700 and the component mounted thereto are fully received in chassis 200, physical contact between guide flanges 718a and 718b with guide members 208 of chassis 200 is minimized or eliminated. Accordingly, carrier 700 and the component mounted thereto may be substantially held into place relative to chassis 200 due to a connector on component 502 engaging its respective connector 212a on backplane 212 and engagement of features 309 and 310 or other features on or proximate to front wall 304 engaging with corresponding features of chassis 200 on or proximate to the front entrance of chassis 200. Such reduced mechanical coupling between chassis 200 and a carrier 700 and its respective component may minimize vibrational effects of such component within chassis 200.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A component carrier, comprising:
    a carrier front wall; and
    a plurality of carrier side walls extending in a substantially parallel orientation to each other from opposite edges of the carrier front wall, and defining a component channel between them, wherein the carrier side walls include respective guide flanges extending substantially perpendicularly therefrom such that the guide flanges are in a substantially parallel orientation to each other and the guide flanges are oriented relative to a remainder of the component carrier such that when a component is mounted within the component channel to the component carrier, the guide flanges define a plane such that a combined mass on a first side of the plane of the component carrier and the component is approximately equal to a combined mass on a second side of the plane of the component carrier and the component;

wherein the guide flanges include a plurality of guide flange portions with spacing therebetween such that:
when the component carrier is partially inserted into a component slot having a plurality of slot guide members with spacing therebetween, the guide flange portions are in contact with the slot guide members; and
when the component carrier is fully inserted into the component slot, the guide flange portions are not in contact with the slot guide members.

2. The component carrier of claim 1, wherein the component is a storage disk.

3. The component carrier of claim 1, wherein the component is mounted to the carrier side walls of the component carrier via couplers that couple the component to the carrier side walls.

4. The component carrier of claim 3, wherein the couplers are screws.

5. An information handling system, comprising:
a chassis having a plurality of component slots, the component slots each including a plurality of slot guide members with spacing therebetween; and
at least one component carrier receivable in a respective one of the plurality of component slots, the component carrier comprising:
a carrier front wall; and
a plurality of carrier side walls extending in a substantially parallel orientation to each other from opposite edges of the carrier front wall, and defining a component channel between them, wherein the carrier side walls include respective guide flanges extending substantially perpendicularly therefrom such that the guide flanges are in a substantially parallel orientation to each other and the guide flanges are oriented relative to a remainder of the component carrier such that when a component is mounted within the component channel to the component carrier, the guide flanges define a plane such that a combined mass on a first side of the plane of the component carrier and the component is approximately equal to a combined mass on a second side of the plane of the component carrier and the component;
wherein the guide flanges include a plurality of guide flange portions with spacing therebetween such that:
when the component carrier is partially inserted into the component slot, the guide flange portions are in contact with the slot guide members; and
when the component carrier is fully inserted into the component slot, the guide flange portions are not in contact with the slot guide members.

6. The information handling system of claim 5, wherein the component is a storage disk.

7. The information handling system of claim 5, wherein the component is mounted to the carrier side walls of the component carrier via couplers that couple the component to the carrier side walls.

8. The information handling system of claim 7, wherein the couplers are screws.

9. A component carrier, comprising:
a carrier front wall; and
a plurality of carrier side walls extending in a substantially parallel orientation to each other from opposite edges of the carrier front wall, and defining a component channel between them, wherein the carrier side walls each include respective guide flanges extending substantially perpendicularly therefrom such that the guide flanges are in a substantially parallel orientation to each other, the guide flanges each including a plurality of guide flange portions with spacing therebetween;
wherein when the component carrier is partially inserted into a component slot having a plurality of slot guide members with spacing therebetween, the guide flange portions are in contact with the slot guide members; and
wherein when the component carrier is fully inserted into the component slot, the guide flange portions are not in contact with the slot guide members.

10. The component carrier of claim 9, wherein a component receivable in the component channel is a storage disk.

11. The component carrier of claim 9, wherein a component is mounted to the carrier side walls of the component carrier via couplers that couple the component to the carrier side walls.

12. The component carrier of claim 11, wherein the couplers are screws.

13. An information handling system, comprising:
a chassis having a plurality of component slots, the component slots each including a plurality of slot guide members with spacing therebetween; and
at least one component carrier receivable in a respective one of the plurality of component slots, the component carrier comprising:
a carrier front wall; and
a plurality of carrier side walls extending in a substantially parallel orientation to each other from opposite edges of the carrier front wall, and defining a component channel between them, wherein the carrier side walls each include respective guide flanges extending substantially perpendicularly therefrom such that the guide flanges are in a substantially parallel orientation to each other, the guide flanges each including a plurality of guide flange portions with spacing therebetween;
wherein when the component carrier is partially inserted into the component slot, the guide flange portions are in contact with the slot guide members; and
wherein when the component carrier is fully inserted into the component slot, the guide flange portions are not in contact with the slot guide members.

14. The information handling system of claim 13, wherein a component receivable in the component channel is a storage disk.

15. The information handling system of claim 13, wherein a component is mounted to the carrier side walls of the component carrier via couplers that couple the component to the carrier side walls.

16. The information handling system of claim 15, wherein the couplers include at least one screw.

* * * * *